United States Patent
Fullam et al.

(10) Patent No.: US 10,345,768 B2
(45) Date of Patent: Jul. 9, 2019

(54) ENVIRONMENTAL CONTROL VIA WEARABLE COMPUTING SYSTEM

(71) Applicant: Microsoft Technology Licensing, LLC, Redmond, WA (US)

(72) Inventors: Scott Fullam, Palo Alto, CA (US); Barry John Corlett, San Francisco, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 820 days.

(21) Appl. No.: 14/500,864

(22) Filed: Sep. 29, 2014

(65) Prior Publication Data
US 2016/0091877 A1    Mar. 31, 2016

(51) Int. Cl.
*G05B 15/02* (2006.01)
*G06T 19/00* (2011.01)
(Continued)

(52) U.S. Cl.
CPC .............. *G05B 15/02* (2013.01); *E06B 9/68* (2013.01); *F24F 11/30* (2018.01); *F24F 11/62* (2018.01);
(Continued)

(58) Field of Classification Search
CPC ................... G05B 15/00; G05B 15/02; G05B 2219/2642; G05B 2219/32014;
(Continued)

(56) References Cited

U.S. PATENT DOCUMENTS 4,251,755 A * 2/1981 Bryden ............... H04N 5/202
                                                   315/367
6,301,845 B1 * 10/2001 Milanian ............... E04H 3/02
                                                     472/59
(Continued)

FOREIGN PATENT DOCUMENTS

CN    101571748 A    11/2009
CN    102542921 A    7/2012
(Continued)

OTHER PUBLICATIONS

Fröhlich J., Wachsmuth I. (2013) The Visual, the Auditory and the Haptic—A User Study on Combining Modalities in Virtual Worlds. In: Shumaker R. (eds) Virtual Augmented and Mixed Reality. Designing and Developing Augmented and Virtual Environments. VAMR 2013. Lecture Notes in Computer Science, vol. 8021. Springer, Berlin, Heidelberg.*

(Continued)

*Primary Examiner* — Jason D Mitchell
(74) *Attorney, Agent, or Firm* — Alleman Hall Creasman & Tuttle LLP

(57) ABSTRACT

Various embodiments relating to controlling ambient environmental conditions to affect one or more human subjects wearing wearable computing systems are disclosed. In one example, a head-mounted computing system includes a see-through display configured to present an augmented reality image in front of an environment when viewed through the see-through display, a logic subsystem, and a storage subsystem. The storage subsystem may hold instructions executable by the logic subsystem to present the augmented reality image via the see-through display, and during presentation of the augmented reality image, send a command to control an environmental control system external to the head-mounted computing system. The command (Continued)

may be configured to trigger adjustment of an environmental parameter of the environment to enhance presentation of the augmented reality image.

19 Claims, 9 Drawing Sheets

(51) Int. Cl.
| | | |
|---|---|---|
| G06F 3/01 | (2006.01) | |
| H05B 37/02 | (2006.01) | |
| E06B 9/68 | (2006.01) | |
| G09G 3/00 | (2006.01) | |
| G06F 3/048 | (2013.01) | |
| H04L 12/28 | (2006.01) | |
| F24F 11/30 | (2018.01) | |
| F24F 11/62 | (2018.01) | |
| A63F 13/25 | (2014.01) | |

(52) U.S. Cl.
CPC ............ *G06F 3/011* (2013.01); *G06F 3/048* (2013.01); *G06T 19/006* (2013.01); *G09G 3/00* (2013.01); *H04L 12/28* (2013.01); *H05B 37/0245* (2013.01); *A63F 13/25* (2014.09); *G05B 2219/2642* (2013.01)

(58) Field of Classification Search
CPC ............ G06T 19/006; F24F 2011/0068; F24F 11/006; F24F 11/061; A63F 13/00; E06B 9/68; G06F 3/011; G06F 3/12; G06F 3/13; G06F 3/15; G06F 3/048; H05B 37/0245
USPC ........................................................ 700/276
See application file for complete search history.

(56) References Cited

U.S. PATENT DOCUMENTS

| | | | | |
|---|---|---|---|---|
| 8,159,417 | B2* | 4/2012 | Nakashima | G02B 27/017 345/7 |
| 8,734,247 | B2* | 5/2014 | Hilbert | G07F 17/3202 463/31 |
| 8,786,585 | B2* | 7/2014 | Longhurst | G09G 5/02 345/207 |
| 9,013,502 | B2* | 4/2015 | Ferguson | H04N 17/02 345/600 |
| 2001/0001303 | A1* | 5/2001 | Ohsuga | A63B 24/00 482/5 |
| 2006/0263758 | A1 | 11/2006 | Crutchfield, Jr. et al. | |
| 2007/0123390 | A1* | 5/2007 | Mathis | A63F 13/06 482/8 |
| 2008/0027337 | A1 | 1/2008 | Dugan et al. | |
| 2009/0108082 | A1 | 4/2009 | Goldmann et al. | |
| 2009/0167950 | A1 | 7/2009 | Chen et al. | |
| 2011/0077548 | A1 | 3/2011 | Torch | |
| 2012/0062445 | A1* | 3/2012 | Haddick | G02B 27/017 345/8 |
| 2012/0113140 | A1* | 5/2012 | Hilliges | G06F 3/011 345/633 |
| 2012/0313746 | A1 | 12/2012 | Rahman et al. | |
| 2012/0316455 | A1 | 12/2012 | Rahman et al. | |
| 2012/0330387 | A1 | 12/2012 | Ferraz Rigo et al. | |
| 2013/0012763 | A1 | 1/2013 | De Waele | |
| 2013/0042296 | A1* | 2/2013 | Hastings | G06F 21/10 726/1 |
| 2013/0141434 | A1* | 6/2013 | Sugden | G02B 27/017 345/426 |
| 2013/0154838 | A1 | 6/2013 | Alameh et al. | |
| 2013/0249942 | A1* | 9/2013 | Green | G06F 3/14 345/633 |
| 2013/0346085 | A1* | 12/2013 | Stekkelpak | G10L 15/22 704/275 |
| 2014/0002344 | A1* | 1/2014 | Pai | G09G 5/363 345/156 |
| 2014/0018169 | A1* | 1/2014 | Ran | A63F 13/00 463/31 |
| 2014/0135997 | A1 | 5/2014 | Bradley et al. | |
| 2014/0180480 | A1 | 6/2014 | Lee et al. | |
| 2014/0184645 | A1* | 7/2014 | Ur | G06T 19/006 345/633 |
| 2014/0316192 | A1* | 10/2014 | de Zambotti | A61M 21/02 600/28 |
| 2015/0028746 | A1* | 1/2015 | Temple | H05B 33/0863 315/129 |
| 2016/0188585 | A1* | 6/2016 | Durham | G06F 3/011 345/633 |
| 2016/0267759 | A1* | 9/2016 | Kerzner | G08B 13/19645 |

FOREIGN PATENT DOCUMENTS

| | | |
|---|---|---|
| CN | 103439793 A | 12/2013 |
| CN | 103487938 A | 1/2014 |
| CN | 203433192 U | 2/2014 |
| CN | 103777615 A | 5/2014 |
| CN | 103823393 A | 5/2014 |
| CN | 103917913 A | 7/2014 |
| CN | 103926890 A | 7/2014 |
| CN | 103975268 A | 8/2014 |
| CN | 103999551 A | 8/2014 |
| EP | 2851894 A1 | 3/2015 |
| JP | 2009269461 A | 11/2009 |
| JP | 2010212899 A | 9/2010 |
| WO | 2014015378 A1 | 1/2014 |
| WO | 2014071332 A1 | 5/2014 |

OTHER PUBLICATIONS

Werriam-Webster Definition of "enhance" as retrieved from <https://www.merriam-webster.com/dictionary/enhance> on Apr. 2, 2018. (Year: 2018).*
Dionisio, J., "Virtual Hell: A Trip Through the Flames", Projects in VR, IEEE Computer Graphics and Applications, vol. 17, Issue 3, May 1997, 4 pages.
Chan, N., "Hands-On with Birdly, a Virtual Reality Flight Simulator", Jamie & Adam TESTED, http://www.tested.com/art/makers/463385-hands-birdly-virtual-reality-flight-simulator/, Aug. 11, 2014, 6 pages.
Hulsmann, F. et al., "Wind and Warmth in Virtual Reality—Requirements and Chances", In Proceedings of the Workshop Virtuelle & Erweiterte Realität 2013, Available as early as Dec. 19, 2014, Retrieved Nov. 26, 2015, 12 pages.
ISA European Patent Office, International Search Report and Written Opinion issued in Application No. PCT/2015/052754, dated Mar. 31, 2016, WIPO, 23 pages.
IPEA European Patent Office, Second Written Opinion issued in Application No. PCT/US2015/052754, dated Jun. 8, 2016, WIPO, 10 pages.
IPEA European Patent Office, International Preliminary Report on Patentability Issued in PCT Application No. PCT/US2015/052754, dated Dec. 16, 2016, WIPO, 14 Pages.
Patel, et al., "A Review of Wearable Sensors and Systems with Application in Rehabilitation", In Journal of Neuroengineering and Rehabilitation, Apr. 20, 2012, 17 pages.
"First Office Action and Search Report Issued in Chinese Patent Application No. 201580052762.9", dated Apr. 2, 2019, 22 Pages. (MS# 355204-CN-PCT).

* cited by examiner

ENVIRONMENTAL CONTROL VIA WEARABLE COMPUTING SYSTEM

BACKGROUND

Environmental control systems may allow various ambient conditions of an environment to be controlled, such as temperature, air flow, and lighting. Such systems may be configured to react automatically to ambient conditions, for example, via a thermostat or light sensor, to maintain an environment in a comfortable range.

SUMMARY

Examples relating to controlling ambient environmental conditions via wearable computing systems are disclosed. In one example, a head-mounted computing system includes a see-through display configured to present an augmented reality image in front of an environment when viewed through the see-through display, a logic subsystem, and a storage subsystem. The storage subsystem may hold instructions executable by the logic subsystem to present the augmented reality image via the see-through display, and during presentation of the augmented reality image, send a command to control an environmental control system external to the head-mounted computing system. The command may be configured to trigger adjustment of an environmental parameter of the environment to enhance presentation of the augmented reality image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure relates to adjusting ambient conditions in an environment to enhance an experience of one or more human subjects wearing wearable computing systems in the environment by controlling an environmental control system external from the wearable computing systems to adjust ambient conditions in the environment. For example, a wearable computing system may comprise one or more biometric sensors configured to provide biometric data of a human subject wearing the wearable computing system. Biometric data from such sensors may be used to estimate a comfort characteristic (e.g., thermal level, eye strain level, and other suitable comfort characteristics) of the human subject. Based upon the biometric data, an environmental control system may be controlled to adjust an environmental parameter of the environment (e.g., ambient temperature, ambient light intensity, ambient light color and other environmental parameters) to change the comfort characteristic of the human subject. In this manner, feedback from the biometric sensors of the wearable computing system may be leveraged to change the comfort level of the human subject as desired via manipulation of ambient environmental conditions.

In some implementations, feedback from biometric sensors of a plurality of wearable computing systems worn by a plurality of human subjects in an environment may be considered collectively to determine or estimate a collective comfort characteristic of the plurality of human subjects. This may allow ambient environmental conditions to be adjusted based upon the group of human subjects.

Some wearable computing system may comprise a see-through display configured to present augmented reality images. Thus, in some examples, the environmental control system may be controlled to adjust an environmental parameter of the environment to enhance presentation of the augmented reality images via the see-through display. The environmental parameter may be adjusted based on the content of the presented augmented reality images, and/or to change a comfort characteristic of the human subject, for example, to align with a comfort level evoked by the content of the presented augmented reality images. By adjusting ambient conditions of an environment to enhance presentation of augmented reality images via a see-through display, the augmented reality experience of human subject may be made more realistic and immersive.

Figure 1:
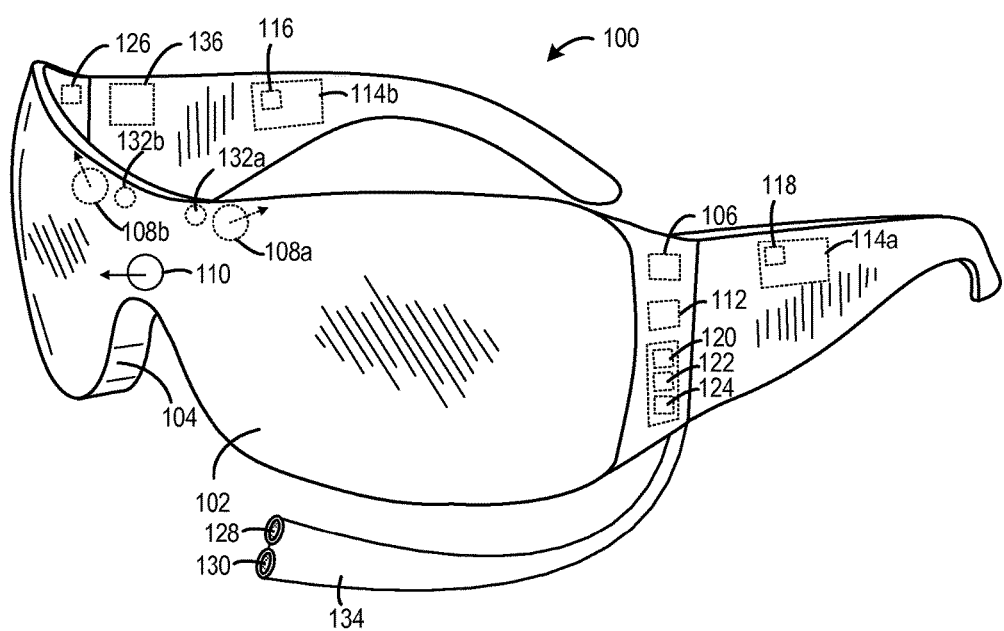
FIG. 1 shows an example wearable computing system.

A wearable computing system may take any suitable form without departing from the scope of the present disclosure. FIG. 1 shows aspects of an example wearable computing system in the form of a head-mounted computing system 100. More particularly, the illustrated computing system takes the form of a pair of wearable glasses comprising a see-through display 102. The head-mounted computing system may take any other suitable form in which a transparent, semi-transparent, and/or non-transparent display is supported in front of a viewer's eye or eyes. In other implementations, the wearable computing system here contemplated may include a head band, an arm-band, an ankle band, a chest strap, or any other wearable form factor.

The see-through display 102 may be configured to visually augment an appearance of a real-world, physical environment to a wearer viewing the physical environment through the transparent display. In one example, the see-through display may be configured to display one or more holographic objects. In some cases, the holographic objects may be overlaid in front of the real-world environment. Further, in some cases, the holographic objects may incorporate elements of real-world objects of the real-world environment seen through the see-through display 102.

Any suitable mechanism may be used to display augmented reality images via the see-through display 102. For example, the see-through display 102 may include image-producing elements located within lenses 104 (such as, for example, a see-through Organic Light-Emitting Diode (OLED) display). As another example, the see-through display 102 may include a display device (such as, for example a liquid crystal on silicon (LCOS) device or OLED microdisplay) located within a frame of the head-mounted computing system 100. In this example, the lenses 104 may serve as a light guide for delivering light from the display device to the eyes of a wearer. Such a light guide may enable a wearer to perceive a 3D holographic image located within the physical environment that the wearer is viewing, while also allowing the wearer to view physical objects in the physical environment. The see-through display 102 may be controlled by a controller 106 to help effect the presentation of augmented reality objects.

The head-mounted computing system 100 may comprise a sensor subsystem including various sensors and related subsystems to provide information to the controller 106. Some of such sensors, for example, may provide biometric data of a human subject wearing the head-mounted computing system. Other such sensors may provide environmental and/or activity data for an environment in which the human subject is located. Example sensors included in the sensor subsystem may include, but are not limited to, one or more inward facing image sensors 108a and 108b, one or more outward facing image sensors 110, an ambient temperature sensor 112, contact sensors 114a and 114b, a skin temperature sensor 116, a pulse-rate sensor 118, an accelerometer 120 a gyroscope 122, a magnetometer 124, a global positioning sensor (GPS) receiver 126, a chemical trace sensor 128, and a microphone 130.

The one or more inward facing image sensors 108a, 108b may be configured to acquire image data in the form of gaze tracking data from a wearer's eyes (e.g., sensor 108a may acquire image data for one eye and sensor 108b may acquire image data for the other eye). The head-mounted computing system 100 may be configured to determine gaze directions of each of a wearer's eyes in any suitable manner based on the information received from the image sensors 108a, 108b. For example, one or more light sources 132a, 132b, such as infrared light sources, may be configured to cause a glint of light to reflect from the cornea of each eye of a wearer. The one or more image sensors 108a, 108b may then be configured to capture an image of the wearer's eyes. Images of the glints and of the pupils as determined from image data gathered from the image sensors 108a, 108b may be used by the controller 106 to determine a direction the wearer is gazing. The controller 106 may be configured to additionally determine an identity of a physical and/or virtual object at which the wearer is gazing. Further, the controller 106 may be configured to measure pupil dilation and blood vessel size of the wearers' eyes based on the image data.

The one or more outward facing image sensors 110 may be configured to receive environmental data from the physical environment in which the head-mounted computing system 100 is located. For example, the one or more outward facing image sensors 110 may include a visible light sensor, an ultraviolet light sensor, an infrared (IR) light sensor, a depth sensor (e.g., time-of-flight, structured light, or other suitable depth sensing system, such as a stereo camera system), and other suitable image sensors.

In some implementations, data from the outward facing image sensors 110 may be used to detect movements within a field of view of the display, such as gesture-based inputs or other movements performed by a wearer or by a person or physical object within the field of view. In some implementations, data from the outward facing sensors may also be used to determine direction/location and orientation data (e.g. from imaging environmental features) that enables position/motion tracking of the head-mounted computing system 100 in the real-world environment. In some implementations, data from the outward facing sensors may also be used to determine ambient temperature conditions of the physical environment (including other human subjects and other suitable sources of temperature variation). For example, temperature may be inferred from long wave IR camera data.

The ambient temperature sensor 112 may be configured to provide a measurement of an ambient temperature of the environment in which the head-mounted computing system 100 is located. The temperature sensor 112 may employ any suitable temperature sensing technology.

The contact sensors 114a and 114b each contact the wearer's skin when heat-mounted computing system 100 is worn and may also include plated contacts. The contact sensors 114a and 114b may include independent or cooperating sensor elements, to provide a plurality of sensory functions. For example, the contact sensors may provide an electrical resistance and/or capacitance sensory function responsive to the electrical resistance and/or capacitance of the wearer's skin. To this end, the two contact sensors may be configured as a galvanic skin-response (GSR) sensor, for example. In the illustrated configuration, the separation between the two contact sensors provides a relatively long electrical path length, for more accurate measurement of skin resistance.

In some examples, a contact sensor may also provide measurement of the wearer's skin temperature. In the illustrated configuration, a skin temperature sensor 116 in the form a thermistor is integrated into charging contact sensor 114b, which provides direct thermal conductive path to the skin. Output from ambient-temperature sensor 112 and skin temperature sensor 116 may be applied differentially to estimate of the heat flux from the wearer's body. This metric can be used to improve the accuracy of pedometer-based calorie counting, for example. In addition to the contact-based skin sensors described above, various types of non-contact skin sensors may also be included.

In some examples, a contact sensor may also provide measurement of electrical activity along the wearer's scalp in the form of electroencephalography (EEG). EEG readings may provide an indication of brain activity, such as in response to sensory stimulus. For example, EEG readings may be used in conjunction with other sensor readings to determine a wearer's emotional state (e.g., determine a level of distress or discomfort). Furthermore, EEG readings may be used to obtain information regarding various other conditions of a wearer.

Arranged inside contact sensor 114a in the illustrated configuration is a pulse-rate sensor 118. In one example, the pulse-rate sensor is an optical pulse-rate sensor that includes a narrow-band (e.g., green) LED emitter and matched photodiode to detect pulsating blood flow through the capillaries of the skin, and thereby provide a measurement of the wearer's pulse rate. In some implementations, the pulse-rate sensor may also be configured to sense the wearer's blood pressure. In some implementations, the pulse rate sensor 118 may be configured to measure pulse rate via pressure. In some implementations, the pulse rate sensor 118 may be configured to measure pulse rate via bio-impedance.

The head-mounted computing system 100 may also include motion sensing componentry, such as an accelerometer 120, gyroscope 122, and/or magnetometer 124. The accelerometer and gyroscope may furnish inertial data along three orthogonal axes as well as rotational data about the three axes, for a combined six degrees of freedom. Data from the accelerometer and gyroscope may be combined with geomagnetic data from the magnetometer to further define the inertial and rotational data in terms of geographic orientation. In some embodiments, data from the outward facing image sensors 110 and the notion sensing componentry may be used in conjunction to determine a position and orientation of the head-mounted computing system 100.

The GPS receiver 126 may be configured to determine the wearer's geographic location and/or velocity. In some implementations, data from the GPS receiver data may be used in conjunction with data from the motion sensing componentry to determine a wearer's position, orientation, velocity, acceleration, and other suitable motion parameters.

The chemical trace sensor 128 may be located on a flexible mouthpiece 134 that may adjustable to position the chemical trace sensor 128 proximate to a wearer's mouth or nose to capture the wearer's breath. The chemical trace sensor 128 may be configured to analyze the wearer's breath to provide data relating to respiration, blood sugar, local oxygen levels, local $CO_2$ levels, local CO levels, and other suitable chemical data.

The microphone 130 may be configured to measure an ambient sound level or receive voice commands from a wearer. In other implementation, the chemical trace sensor and the microphone may be positioned on another suitable portion of the head-mounted computing system 1000. For example, these sensors may be positioned on a frame structure proximate to the base of the see-through display 102.

The head-mounted computing system 100 may include a communication suite 136 comprising any suitable wired or wireless communications I/O interface componentry. The communication suite 136 may be configured to enable the head-mounted computing system 100 to communicate with other remote computing systems. For example, the communication suite 136 may include, but is not limited to, USB, two-way Bluetooth, Bluetooth Low Energy, Wi-Fi, cellular, Ethernet, near-field communication, and/or other suitable communication componentry. In some implementations, the communication suite may include an additional transceiver for optical, line-of-sight (e.g., infrared) communication.

The controller 106 may include a logic subsystem and a storage subsystem, discussed in more detail below with respect to FIG. 14, holding instructions executable by the logic subsystem to provide various functionality. For example, as described above, the head-mounted computing system 100 may be configured to remotely control an environmental control system external from the head-mounted computing system 100 to adjust ambient conditions to affect the human subject. The head-mounted computing system 100 may control adjustment of various environmental parameters to affect the human subject differently for different experiences or under different conditions.

In one example, the storage subsystem may hold instructions executable by the logic subsystem to receive biometric data from one or more biometric sensors of the sensor subsystem, determine or estimate a comfort characteristic of a human subject wearing the head-mounted computing system based on the biometric data, and send a command to the environmental control system. The command may be configured to trigger adjustment of an environmental parameter of the environment to change the comfort characteristic of the human subject.

Any suitable biometric data may be used to determine or estimate any suitable comfort characteristic of the human subject. For example, the biometric data may be used to determine or estimate temperature, stress, fatigue, vision characteristics (e.g. eye strain), excitement, and/or other suitable comfort characteristics of the human subject.

Any suitable environmental parameter may be adjusted to change the comfort characteristic of the human subject. For example, ambient light intensity, ambient light color or hue, ambient temperature, ambient air flow, ambient oxygen levels, and other suitable environmental parameters may be adjusted by an environmental control system.

In another example, the storage subsystem may hold instructions executable by the logic subsystem to present an augmented reality image via the see-through display 102, and during presentation of the augmented reality image, send a command to control an environmental control system. The command may be configured to trigger adjustment of an environmental parameter of the environment to enhance presentation of the augmented reality image.

Presentation of the augmented reality image may be enhanced in any suitable manner. For example, an environmental parameter may be adjusted to increase a contrast ratio of the augmented reality image to make the augmented reality image more easily viewable.

In some implementations, the storage subsystem may hold instructions executable by the logic subsystem to determine that a display parameter of the see-through display has reached an end of an adjustment range, and to send a command to the environmental control system. The command may be configured to trigger adjustment of the environmental parameter based on the display parameter. For example, a brightness of the see-through display may be set to a maximum of the range of brightness, and a contrast ratio of the augmented reality image may be determined to be too low based on an ambient light intensity of the environment. Accordingly, the command may be sent to the environmental control system to lower the ambient light intensity of the environment.

In another example, an environmental parameter may be adjusted based on the content of the augmented reality image. For example, the environmental parameter may be adjusted to make the augmented reality image seem more immersive or realistic. In another example, the environmental parameter may be adjusted to enhance a mood or emotion evoked by the content. For example, ambient light intensity or color of the environment may be adjusted to fit the mood of the content. In some implementations, the content presented via the see-through display may include mood metadata indicating a particular mood and/or corresponding environmental conditions that fit the mood. For example, particular scenes of video content may be tagged with different moods (e.g., scary, romantic, exciting, and other suitable moods), and the head-mounted computing system may send commands to dynamically change environmental conditions to match the mood tags. For example, the different mood tags may have predefined environmental condition settings and/or ranges.

In some implementations, the storage subsystem may hold instructions executable by the logic subsystem to, during presentation of the augmented reality image, detect a content-based trigger, and in response to the content-based trigger, send a command to control the environmental control system. The command may be configured to trigger adjustment of an environmental parameter of the environment to enhance presentation of content corresponding to the content-based trigger. A content-based trigger may include presentation of any suitable object, scene, action, character, or other suitable event.

In some implementations, the head-mounted computing system may be configured to determine a comfort characteristic of a human subject, and further send commands to an external remote-controlled environmental component to adjust environmental parameters. In other implementations, such functionality may be instead located at an environmental control system external to the wearable computing system. In other words, the environmental control system may include logic and related subsystems to determine comfort characteristics of one or more human subjects and send commands to one or more remote-controlled components to adjust environmental parameters on behalf of the human subjects.

Figure 2:
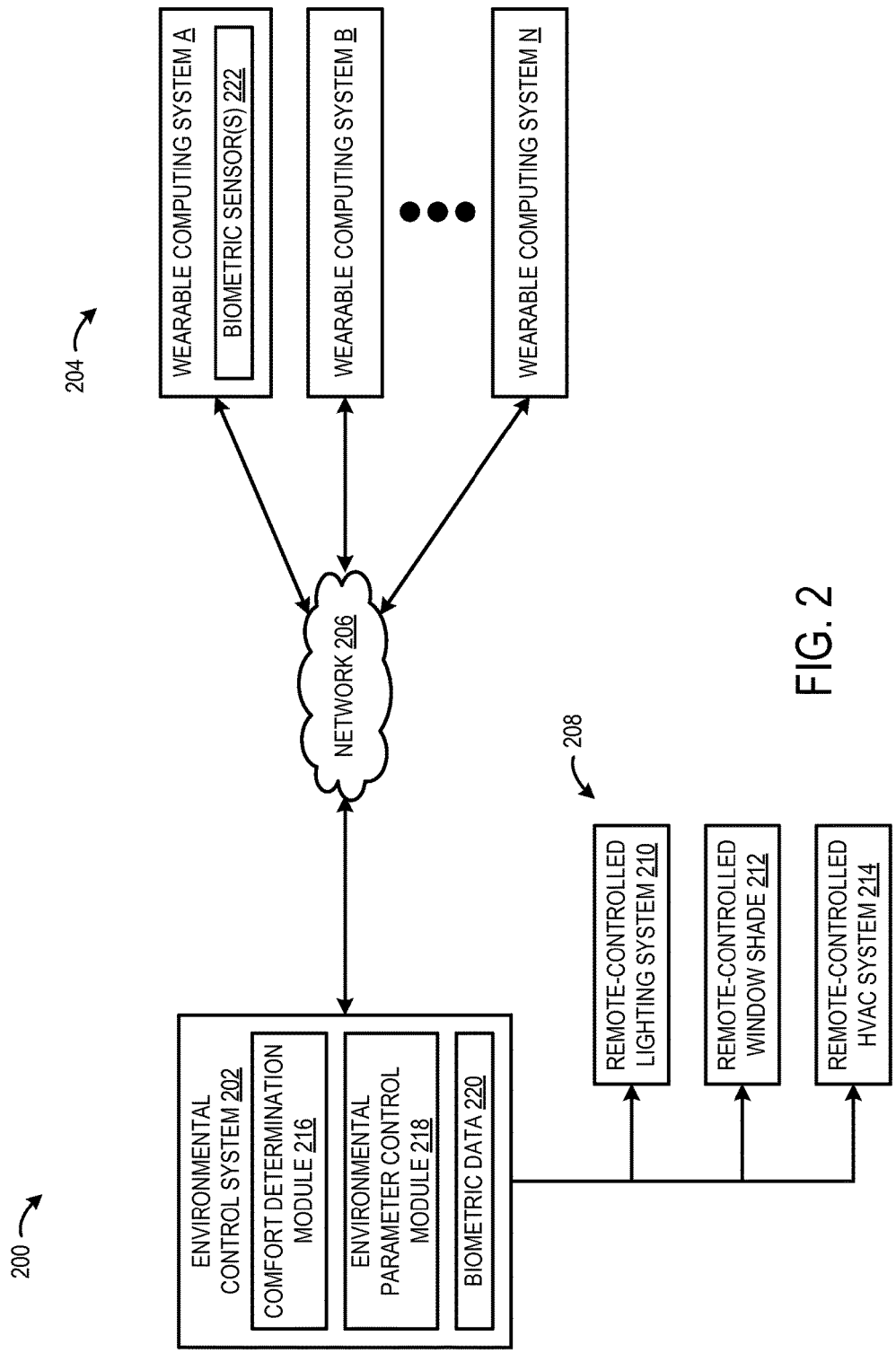
FIG. 2 shows a block diagram of an example environment in which ambient conditions may be adjusted to affect one or more human subjects wearing wearable computing systems.

FIG. 2 shows an example computing environment 200. The computing environment 200 may include an environmental control system 202 configured to adjust ambient conditions of the computing environment on behalf of a plurality of human subjects wearing a plurality of wearable computing systems 204 (e.g., WEARABLE COMPUTING SYSTEM A, WEARABLE COMPUTING SYSTEM B, WEARABLE COMPUTING SYSTEM N). The environmental control system 202 may be in communication with the plurality of wearable computing systems 204 via a network 206, such as the Internet. The environmental control system 202 may provide remote processing and control functionality for any suitable number of and type of wearable computing systems. In some implementations, the environmental control system 204 may be representative of a plurality of different network-connected computing devices, such as in a cloud-based computing system.

The environmental control system 202 may be configured to control a one or more remote-controlled environmental components 208. Each remote-controlled environmental component may be configured to adjust an ambient environmental parameter of the computing environment 200. The environmental control system 202 may communicate with the remote-controlled environmental components in any suitable manner. For example, each remote-controlled environmental component may include a wired or wireless I/O interface (e.g., Wi-Fi, Bluetooth, Ethernet, or another suitable communication protocol) to connect with the environmental control system 202.

In some implementations, one or more of the plurality of remotely-controlled environmental components 208 may be integrated into the environmental control system 202.

In the illustrated example, the environmental control system 202 may be configured to control a remote-controlled lighting system 210, a remote-controlled window shade 212, and a remote-controlled HVAC system 214. The remote-controlled lighting system 210 may be configured to adjust an ambient light intensity and/or ambient light color or hue of the computing environment 200. The remote-controlled lighting system 210 may include, for example, a plurality of different colored LEDs that may be individually adjustable to vary the color and/or light intensity emitted by the LEDs.

The remote-controlled window shade 212 may be configured to adjust an amount of ambient light or light intensity provided to the computing environment 200 via a window. In one example, the window shade may be substantially opaque, and the window shade may be adjusted to vary an area of the window that is covered by the window shade to vary the amount of ambient light provided via the window. In another example, the window shade may vary an opacity or translucency of the window shade to adjust the amount of light intensity provided via the window. For example, the window shade may include louvers or a dynamically variable tinting to vary the opacity of the window shade or window surface treatments.

The remote-controlled HVAC system 214 may be configured to adjust a temperature and/or air flow of the computing environment 200. In one example, the HVAC system may include a heater, a fan, and/or an air conditioner to adjust the temperature and/or air flow of the computing environment 200. The HVAC system may include any suitable component to adjust ambient temperature, air flow, oxygen level, and other suitable environmental parameters.

As discussed above, the environmental control system 202 may be configured to provide remote processing and control functionality for the plurality of wearable computing systems 204 to adjust environmental parameters of the computing environment 200 in order to enhance or otherwise affect an experience of human subjects wearing the plurality of wearable computing systems 204. To this end, the environmental control system 202 may include a comfort determination module 216 and an environmental parameter control module 218

The comfort determination module 216 may be configured to receive biometric data 220 from biometric sensors of the plurality of wearable computing systems 204. For example, WEARABLE COMPUTING SYSTEM A may send biometric data provided from biometric sensor(s) 222 that represent a comfort characteristic of the human subject wearing WEARABLE COMPUTING SYSTEM A. Likewise, WEARABLE COMPUTING SYSTEM B may send, to the environmental control system, biometric data provided from biometric sensor(s) that represent a comfort characteristic of the human subject wearing WEARABLE COMPUTING SYSTEM B, and WEARABLE COMPUTING SYSTEM N may send to the environmental control system, biometric data provided from biometric sensor(s) that represent a comfort characteristic of the human subject wearing WEARABLE COMPUTING SYSTEM N. The biometric data 220 may provide a collective representation of the plurality of human subjects in the computing environment 200. Accordingly, the comfort determination module 216 may be configured to determine a collective comfort characteristic of the plurality of human subjects in the computing environment 200 based on the biometric data 220.

The collective comfort characteristic may be determined in any suitable manner. For example, an average comfort characteristic may be determined from a plurality of individual comfort characteristics. As a more specific example, a collective comfort characteristic may include an average temperature or thermal level of the plurality of human subjects. In another example, a comfort characteristic that is representative of a majority of the human subjects may be determined. In this example, the collective comfort characteristic may effect a change in ambient conditions that may not be beneficial to all human subjects. For example, if one human subject is determined to be too cold and the other human subjects are determined to be too hot, then the collective comfort characteristic may indicate that the plurality of human subjects are too hot.

In some implementations, in determining the collective comfort characteristic of the plurality of human subjects, biometric data or comfort characteristics of different human subjects may be weighted differently. For example, a different weight may be applied based on a position of a human subject in the computing environment. As a more specific example, data for human subjects located closer to a remote-controlled environmental component may be weighted more or less than data for a human subject positioned farther away from the remote-controlled component. In another example, human subject having similar comfort characteristics may be weighted more heavily in order to reduce the effect of any outliers on the collective comfort characteristic.

Once the collective comfort characteristic is determined, the environmental parameter control module 218 may be configured to provide appropriate control to one or more of the plurality of remote-controlled environmental components 208 to adjust an environmental parameter of the computing environment 200 to change the collective comfort characteristic of the plurality of human subjects. For example, environmental parameter control module 218 may provide control to the remote-controlled environmental components based on biometric data feedback for the plurality of human subjects until a desired change of the collective comfort characteristic is achieved.

In one particular example where multiple remote-controlled environmental components are controlled, in response to determining that the plurality of human subjects are too hot, the module 218 may command the remote-controlled lighting system 210 to lower the light intensity of emitted light. Further, the module 218 may command the remote-controlled window shade 212 to cover up a window. Further, the module 218 may command the remote-controlled HVAC system 214 to turn on a fan or provide air conditioning. Accordingly, the different remote-controlled components may be controlled collectively to cool the computing environment 200.

In some implementations, each remote-controlled environmental component may include may include command logic to operate independently. In such implementations, sensor data from the plurality of wearable computing systems may be sent to each environmental component. In other implementations, a selected wearable computing system of the plurality of wearable computing systems may act as the environmental control system. For example, a designated wearable computing system may receive biometric sensor data from the plurality of wearable computing systems, determine a collective comfort characteristic, and send commands to control the plurality of remote-controlled environmental components based on the collective comfort characteristic.

Figure 3:
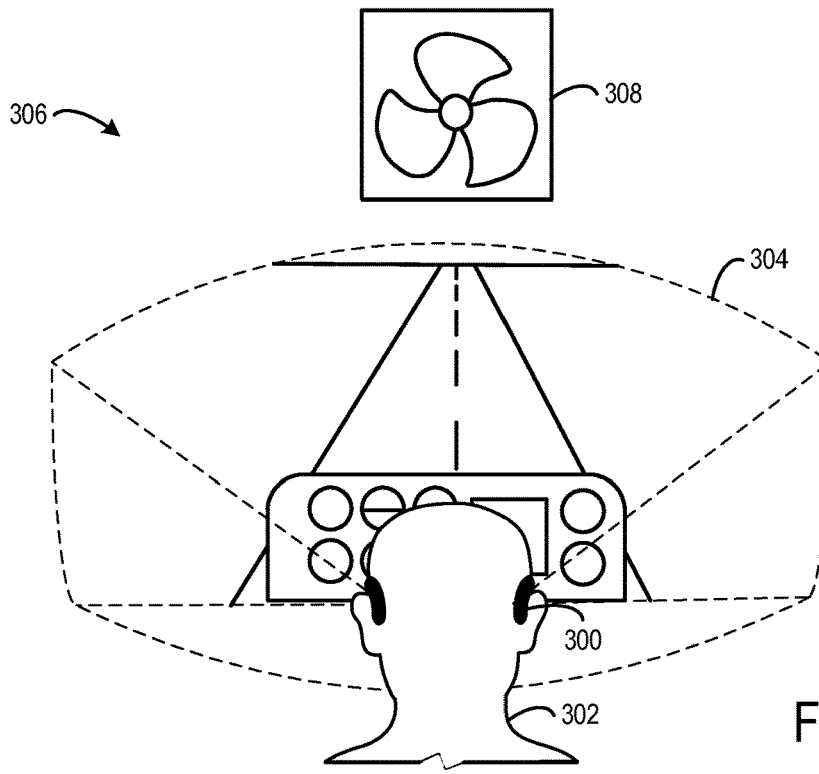
FIGS. 3-4 show an example scenario where an ambient airflow of an environment may be adjusted via a heating, ventilation, and air conditioning (HVAC) system to enhance presentation of an augmented reality image.
Figure 4:
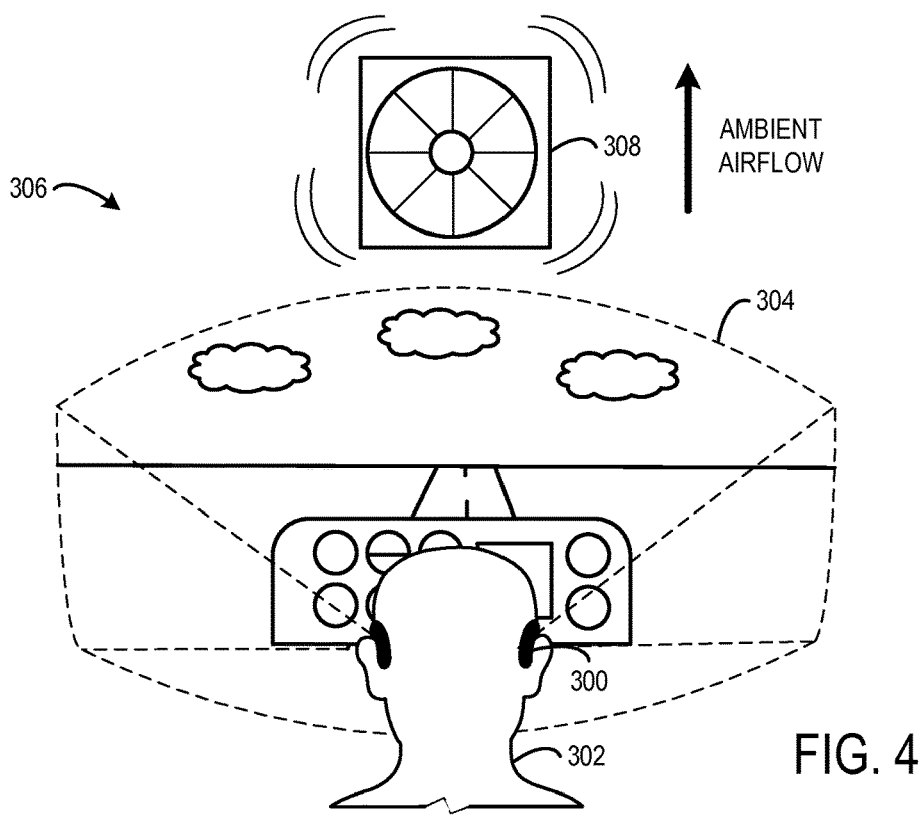

FIGS. 3-4 show an example scenario where an ambient airflow of an environment may be adjusted via an HVAC system to enhance presentation of an augmented reality image. More specifically, a head-mounted computing system 300 worn by a human subject 302 utilizes a see-through display 304 to present augmented reality images in the form of a flight simulator displayed in front of a background environment 306. Further, ambient conditions of the environment 306 may be adjusted by an HVAC system including a fan 308.

In FIG. 3, the see-through display 304 depicts a virtual scene in which a virtual plane is sitting at a standstill on a runway waiting to take off. Under these conditions (e.g., where the virtual plane is not moving), the fan 308 may not be operating in order to align with the human subject's expectations of the virtual scene.

In FIG. 4, the see-through display 304 depicts a virtual scene in which the virtual plane is taking off and flying above the runway. The take-off of the virtual plane may act as a content-based trigger that is detected by the head-mounted computing system 300. In response to detecting the content-based trigger, the head-mounted computing system 300 may send a command to turn on the fan and blow air at the human subject, thereby increasing ambient airflow directed at the human subject while the virtual plane is flying. In this manner, the augmented reality experience of the human subject may be made more immersive.

Additionally, in some implementations, other environmental parameters may be adjusted to enhance presentation of the flight simulator via the see-through display. For example, when the human subject turns the virtual plane in a direction more towards a virtual sun, the head-mounted computing system 300 may be configured to send a command to a remote-controlled lighting system to increase an ambient light intensity while the virtual plane is flying in that direction.

Figure 5:
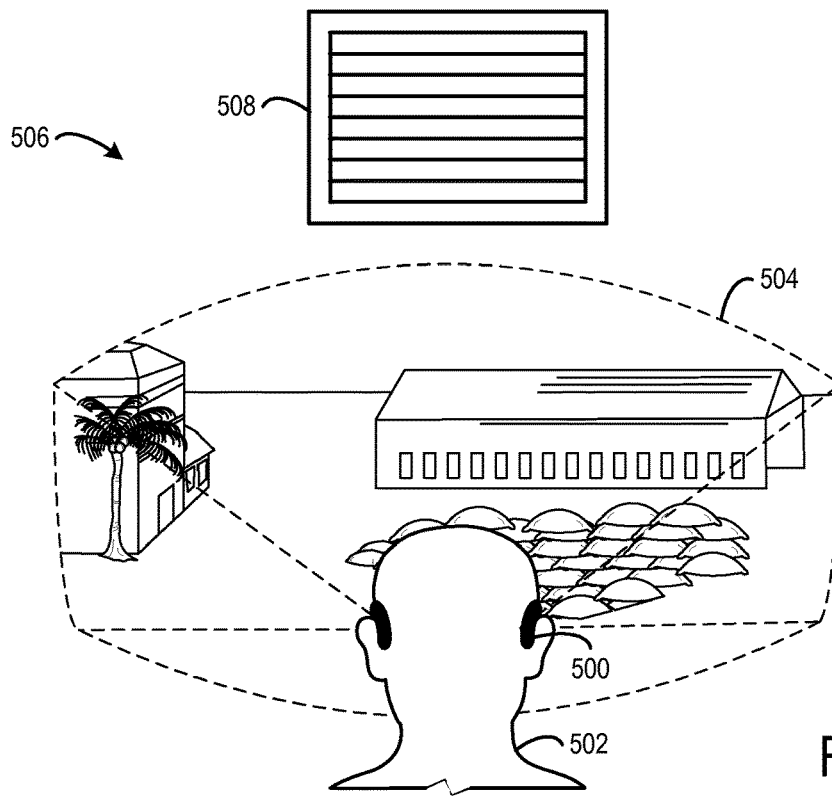
FIGS. 5-6 show an example scenario where an ambient temperature of an environment may be adjusted via an HVAC system to change a comfort characteristic of a human subject responsive to a content-based trigger that occurs during presentation of augmented reality content.
Figure 6:
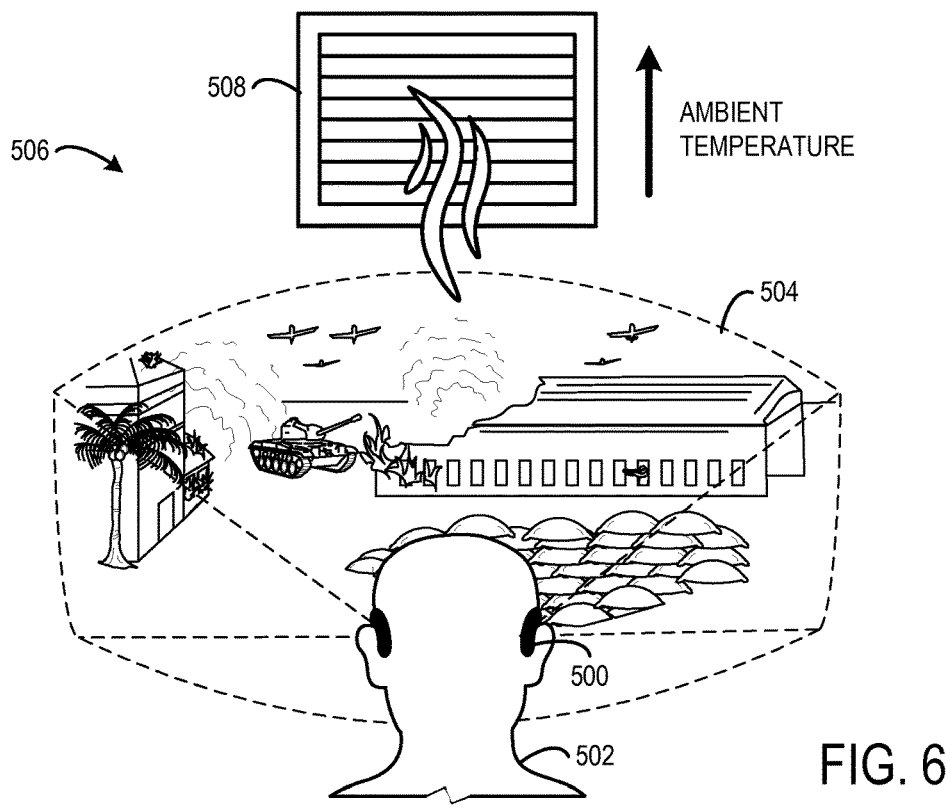

FIGS. 5-6 show an example scenario where an ambient temperature of an environment may be adjusted via an HVAC system to change a comfort characteristic of a human subject responsive to content-based trigger that occurs during presentation of augmented reality content. In particular, a head-mounted computing system 500 worn by a human subject 502 may include a see-through display 504 that presents augmented reality images in the form of a war video game displayed in front of a background environment 506. Further, ambient conditions of the environment 506 may be adjusted by an HVAC system including a heater 508.

In FIG. 5, the see-through display 504 depicts a virtual scene of a virtual village prior to the start of a battle. Under these conditions (e.g., where the virtual village is quiet and still), the heater 508 may not be operating in order to align with the human subject's expectations of the virtual scene.

In FIG. 6, the see-through display 504 depicts a virtual scene in the midst of a battle where explosions and fires are occurring. This may act as a content-based trigger that is detected by the head-mounted computing system 500. In response to detecting the content-based trigger, the head-mounted computing system 500 may send a command to the heater 508 to trigger adjustment of ambient temperature in the environment 506. In response, the heater may increase the ambient temperature. By activating the heater to increase the ambient temperature when the virtual explosions and fire occur, the human subject may feel the heat of battle. In other words, the augmented reality experience of the human subject may be made more realistic and immersive.

In some implementations, instead of increasing the ambient temperature responsive to a content-based trigger, the head-mounted computing system 500 may detect an increase in a stress or emotional level of the human subject based on biometric sensor feedback while the battle is occurring. In this example, the head-mounted computing system 500 may control the heater 508 to increase the ambient temperature to intensify or increase the emotional response of the human subject.

In similar example, when the human subject is playing the virtual war game and is virtually shot or otherwise injured, the head-mounted computing system 500 may detect the virtual injury, and in response to detecting the virtual injury may control a remote-controlled lighting system to change an ambient light color to emit red light in order to enhance the feeling of being injured.

Figure 7:
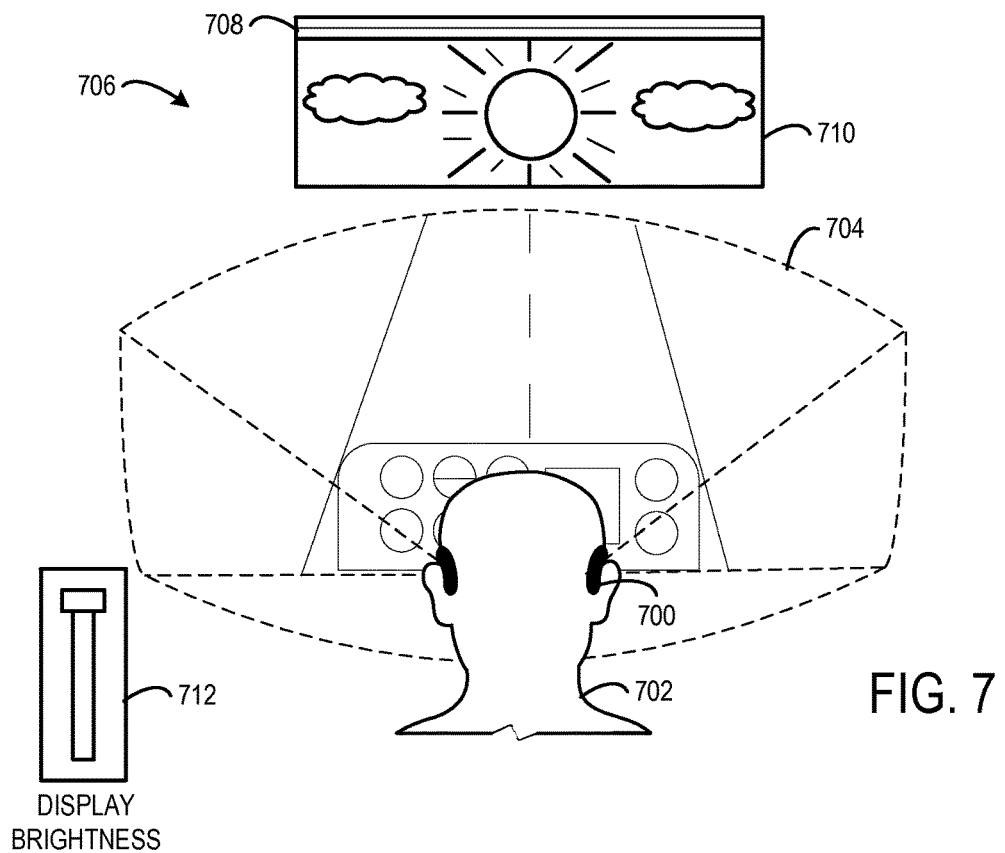
FIGS. 7-8 show an example scenario where an ambient light intensity of an environment may be adjusted via a remote-controlled window shade to enhance presentation of an augmented reality image.
Figure 8:
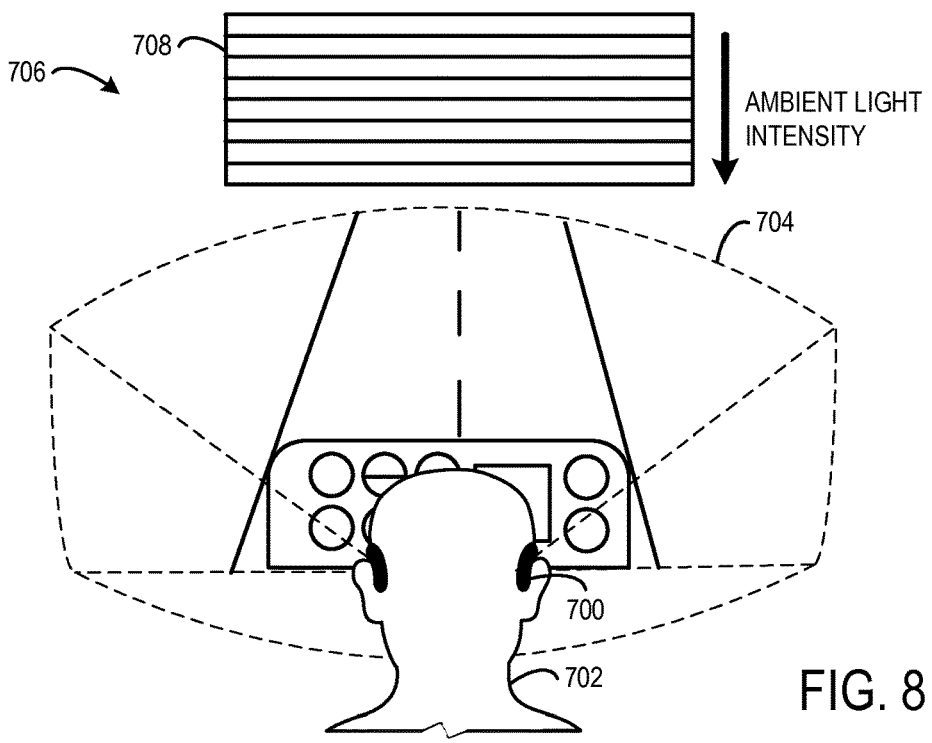

FIGS. 7-8 show an example scenario where an ambient light intensity of an environment may be adjusted via a remote-controlled window shade to enhance presentation of an augmented reality image. In this example, a head-mounted computing system 700 worn by a human subject 702 presents via a see-through display 704 augmented reality images in the form of a flight simulator displayed in front of a background environment 706. Further, ambient conditions of the environment 706 may be adjusted by a remote-controlled window shade 708 mounted to a window 710.

In FIG. 7, the see-through display 704 depicts a virtual scene in which a virtual plane is sitting at a standstill on a runway waiting to take off. The virtual scene has a low contrast ratio that may not be easily viewable by the human subject 702, due to an ambient light intensity of the environment 706 being high from sunlight passing through the window 710. Further, the head-mounted computing system 700 may estimate that an eyestrain level of the human subject 702 is high based on biometric sensor feedback (e.g., dilated pupils, squinting eyelids, and other gaze detection parameters). In this example, a brightness 712 of the see-through display 704 has reached an end of an adjustment range. In other words, the settings of the see-through display cannot be adjusted any further to make the virtual scene more viewable.

In FIG. 8, the head-mounted computing system 700 sends a command to the remote-controlled window shade 708 based on the estimated eye strain level of the human subject 702 (and/or the brightness of the see-through display being at the end of the adjustment range) to lower the shade over the window. Accordingly, the estimated eye strain level of the human subject 702 may be reduced and the contrast ratio of the virtual scene may be increased to enhance the viewing experience of the human subject.

A comfort characteristic may be adjusted in any suitable manner. In some cases, the comfort characteristic may be adjusted to increase a comfort level of a human subject. For example, ambient conditions may be adjusted to soothe a human subject so that the human subject may relax and enjoy content presented to the human subject. In other cases, the comfort characteristic may be adjusted to decrease a comfort level of a human subject. For example, ambient conditions may be adjusted to fit a mood of content being presented to the human subject (e.g., a horror movie, a war video game, or other stressful content).

Figure 9:
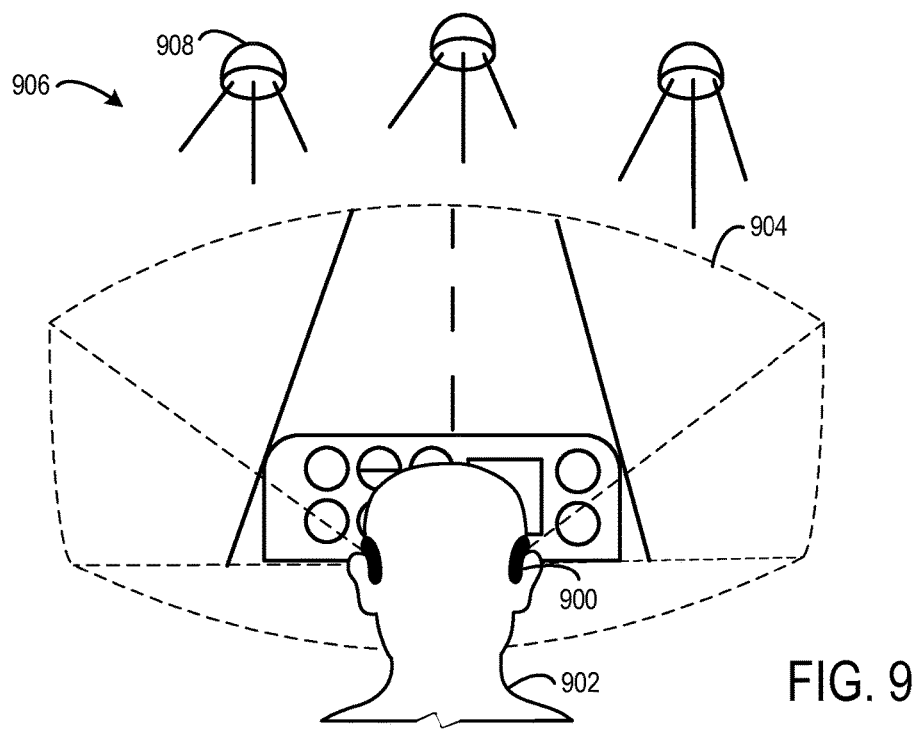
FIGS. 9-10 show an example scenario where show an example scenario where an ambient light color of an environment may be adjusted via a remote-controlled lighting system to enhance a presentation of an augmented reality image.
Figure 10:
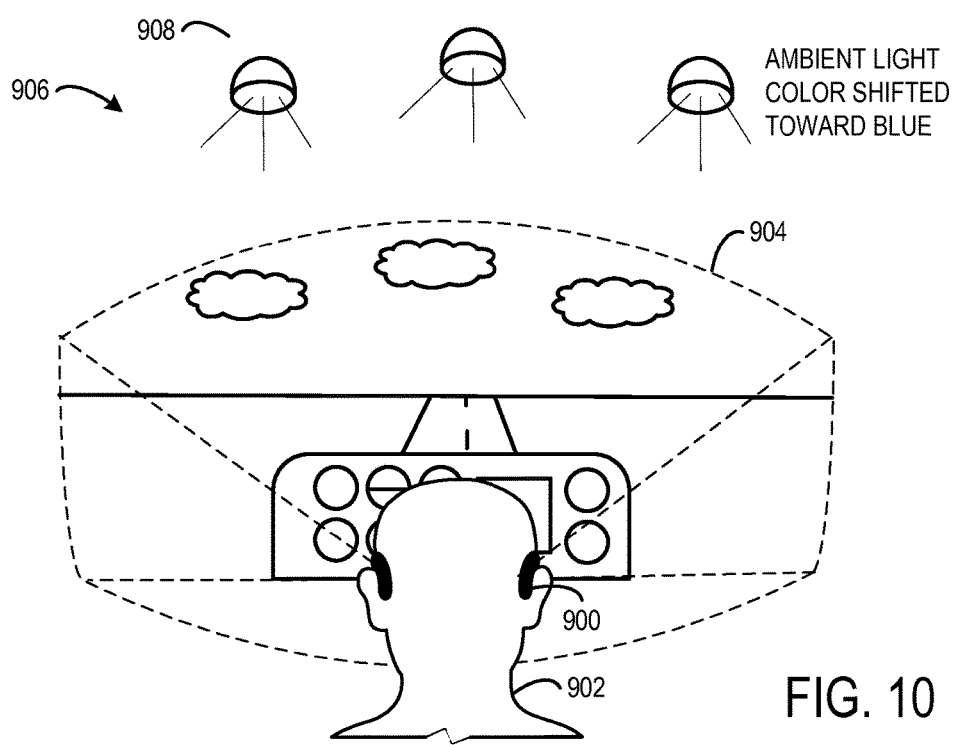

FIGS. 9-10 show an example scenario an ambient light color of an environment may be adjusted via a remote-controlled lighting system to enhance presentation of an augmented reality image. In this example, a head-mounted computing system 900 worn by a human subject 902 presents via a see-through display 904 augmented reality images in the form of a flight simulator displayed in front of a background environment 906, and ambient conditions of the environment 906 may be adjusted by a remote-controlled lighting system 908.

In FIG. 9, the see-through display 904 depicts a virtual scene in which a virtual plane is sitting at a standstill on a runway waiting to take off. Under these conditions (e.g., the plane is sitting on the ground), the head-mounted computing system 900 may control the remote-controlled lighting system 908 to provide a light color that mimics natural lighting.

In FIG. 10, the see-through display 904 depicts a virtual scene in which the virtual plane is taking off and flying above the runway. In response to the change in content being presented, the head-mounted computing system 900 sends a command to the remote-controlled lighting system 908 to change the light color provided by the remote-controlled lighting system to shift to a bluer hue. This may represent the blue color of the sky in actual flight, and thus may enhance the augmented reality presentation.

Figure 11:
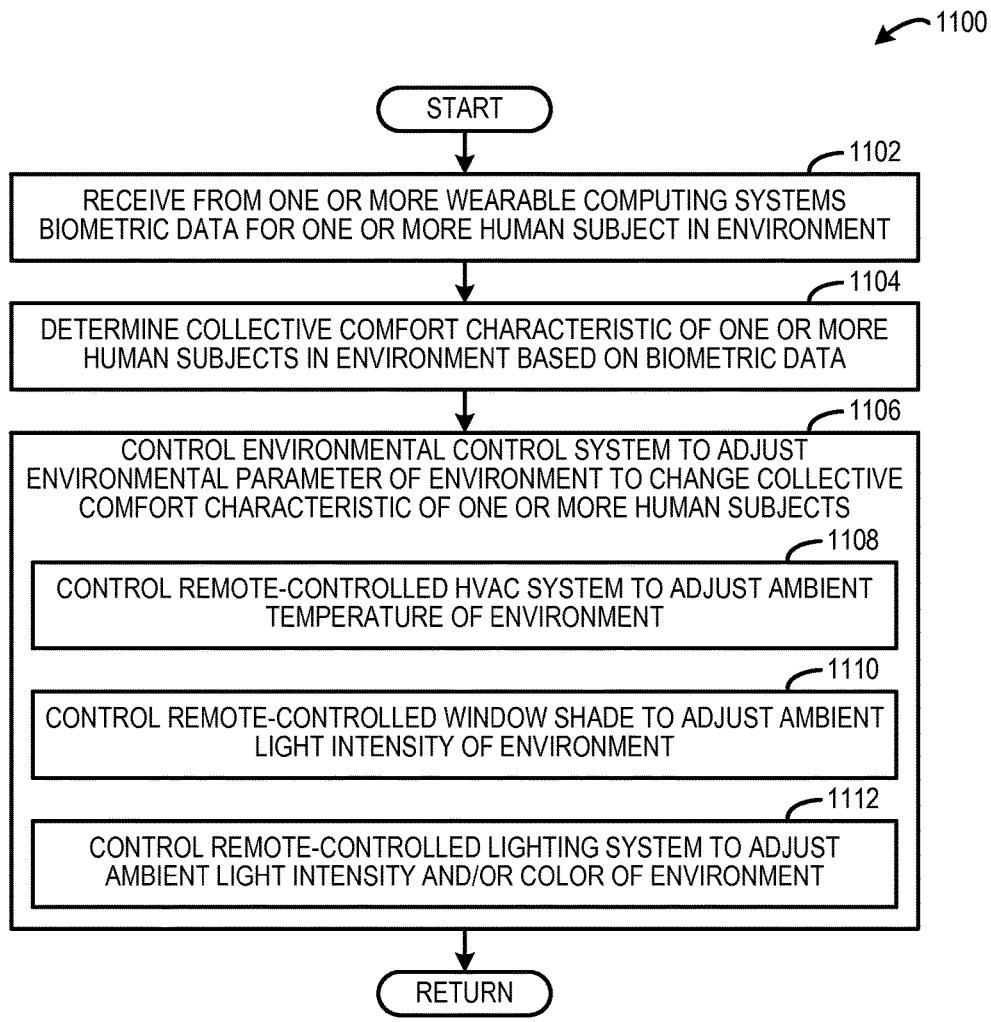
FIG. 11 shows an example method for adjusting one or more ambient conditions of an environment to change a comfort characteristic of one or more human subjects based on biometric sensor feedback.

FIG. 11 shows an example method 1100 for adjusting ambient conditions of an environment to change a comfort characteristic of one or more human subjects based on biometric sensor feedback for the one or more human subjects. The method 1100 may be performed, for example, by the head-mounted computing system 100 shown in FIG. 1. In another example, the method 1100 may be performed by the environmental control system 202 shown in FIG. 2. At 1102, the method 1100 may include receiving from one or more wearable computing systems biometric data. Each of the one or more wearable computing systems may include one or more biometric sensors configured to provide biometric data for a human subject wearing the wearable computing system in an environment. For each wearable computing system, the biometric data may represent a comfort characteristic of the human subject wearing the wearable computing system.

At 1104, the method 1100 may include determining a collective comfort characteristic of the one or more human subjects based on the biometric data. Example comfort characteristics may include, but are not limited to, temperature, stress level, fatigue, eye strain, and other suitable comfort characteristics. In the case of determining a collective comfort characteristic for a plurality of human subjects, the biometric data of the different human subject may be collective considered in the determination or estimation. In some implementations, biometric data of different human subjects may be weighted differently in determining the collective comfort characteristic of the plurality of human subjects.

At 1106, the method 1100 may include controlling an environmental control system external to the plurality of wearable computing systems to adjust an environmental parameter of the environment to change the collective comfort characteristic of the one or more human subjects.

In some implementations, the environmental control system may include a remote-controlled HVAC system. In such implementations, at 1108, the method 1100 may include controlling the remote-controlled HVAC system to adjust an ambient temperature of the environment to change the collective comfort characteristic of the plurality of human subjects.

Further, in some implementations, the environmental control system may include a remote-controlled window shade. In such implementations, at 1110, the method 1100 may include controlling the remote-controlled window shade to adjust an ambient light intensity of the environment to change the collective comfort characteristic of the one or more human subjects.

Additionally, in some implementations, the environmental control system may include a remote-controlled lighting system. In such implementations, at 1112, the method 1100 may include controlling the remote-controlled lighting system to adjust an ambient light intensity and/or color of the environment to change the collective comfort characteristic of the one or more human subjects.

By determining a comfort level of a human subject based on biometric data from a wearable computing system worn by the human subject, an environmental control system external to the wearable computing system may be controlled to adjust ambient conditions in order to affect the comfort level of the human subject as desired. Moreover, by aggregating biometric data for a plurality of human subjects, a collective comfort level of the plurality of human subject may be determined. As such, the environmental control system may be controlled to collectively accommodate at least some of plurality of human subjects.

Figure 12:
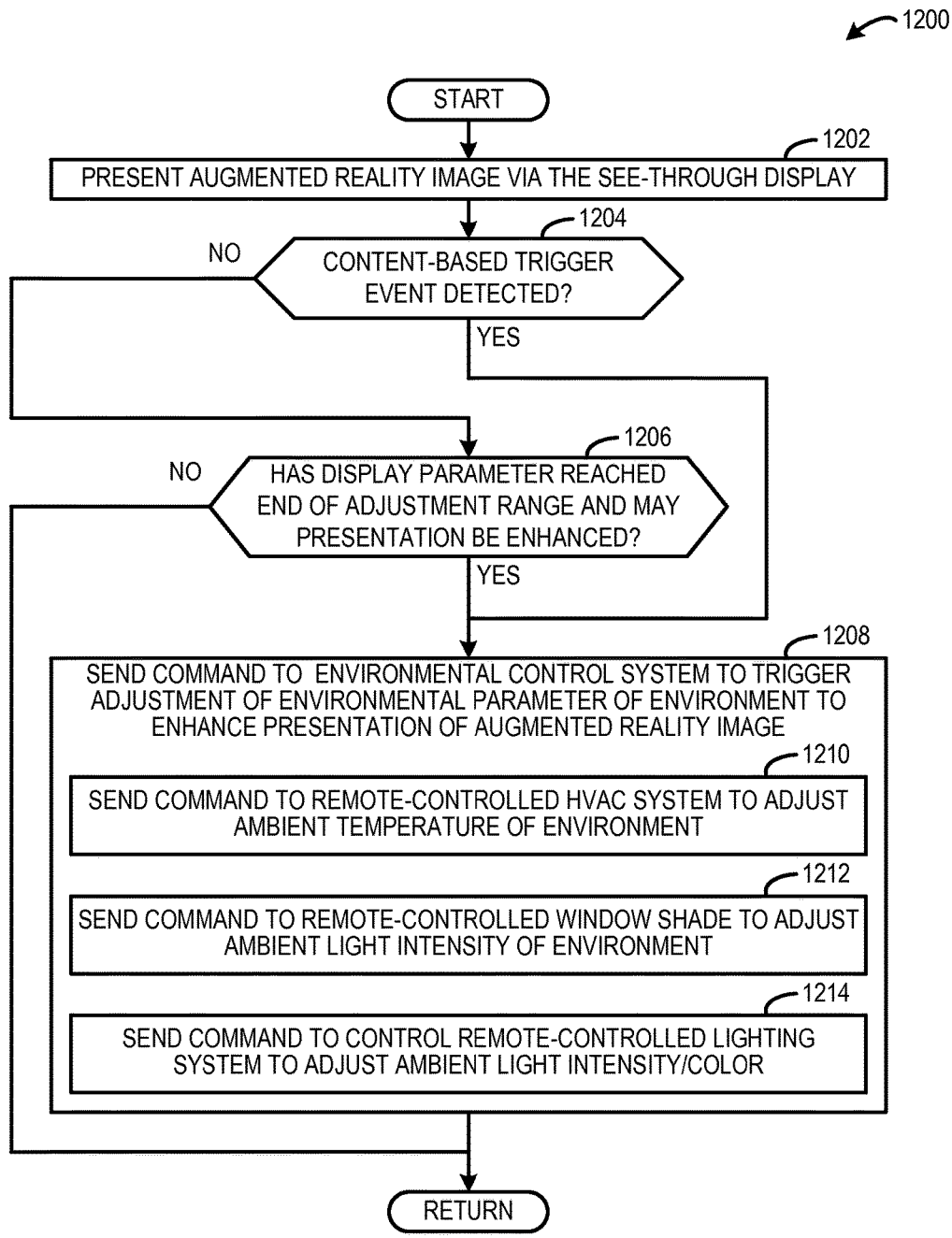
FIG. 12 shows a flow diagram depicting an example method for adjusting ambient conditions of an environment to enhance presentation of an augmented reality image via a see-through display in from of the environment.

FIG. 12 shows an example method 1200 for adjusting ambient conditions of an environment to enhance presentation of an augmented reality image via a see-through display in from of the environment. The method 1200 may be performed, for example, by the head-mounted computing system 100 shown in FIG. 1. At 1202, the method 1200 may include presenting an augmented reality image via a see-through display of a head-mounted computing system. In some examples, at 1204, during presentation of the augmented reality image, it may be determined whether a content-based trigger has been detected, wherein a content-based trigger may include presentation of any suitable object, scene, action, character, or other suitable event presented in the augmented reality image. Further, a content-based trigger may include mood metadata indicating a given mood of the presented content. In some implementations, the mood metadata may further define the desired environmental conditions to match the indicated mood. If the content-based trigger is detected, then the method 1200 moves to 1208, and otherwise to 1206.

In other implementations of the method, the content-based trigger determination may be omitted, and environmental conditions may be adjusted based on other suitable parameters, such as a comfort characteristic of a human subject wearing the head-mounted computing system.

At 1206, the method 1200 may include determining whether a display parameter has reached an end of an adjustment range and whether presentation of the augmented reality image may be further enhanced by adjusting ambient conditions. If it is determined that presentation may be further enhanced, then the method 1200 moves to 1208. Otherwise, the method 1200 returns to other operations.

In one non-limiting example, a brightness of the see-through display may be adjusted to a maximum brightness level, and it may be determined that the environment has a high ambient light intensity that may interfere with viewing, even at the high display brightness. In this example, the ambient light intensity may be reduced to further enhance presentation of the augmented reality image. In other implementations, the determination that an end of a display parameter adjustment range has been reached may be omitted, and an external environmental system may be controlled without reference to whether an end of a display parameter adjustment range has been reached.

At 1208, the method 1200 may include sending a command to control an environmental control system external to the head-mounted computing system. The command may be configured to trigger adjustment of an environmental parameter of the environment to enhance presentation of the augmented reality image. In some implementations, the environmental control system may include a remote-controlled HVAC system. In such implementations, at 1210, the method 1200 may include sending a command configured to control the remote-controlled HVAC system to adjust an ambient temperature of the environment to enhance presentation of the augmented reality image. Further, in some implementations, the environmental control system may include a remote-controlled window shade. In such implementations, at 1212, the method 1200 may include sending a command configured to control the remote-controlled window shade to adjust an ambient light intensity of the environment to enhance presentation of the augmented reality image. Additionally, in some implementations, the environmental control system may include a remote-controlled lighting system. In such implementations, at 1214, the method 1200 may include sending a command configured to control the remote-controlled lighting system to adjust an ambient light intensity and/or color of the environment to enhance presentation of the augmented reality image.

In some implementations, the methods and processes described herein may be tied to a computing system of one or more computing devices. In particular, such methods and processes may be implemented as a computer-application program or service, an application-programming interface (API), a library, and/or other computer-program product.

Figure 13:
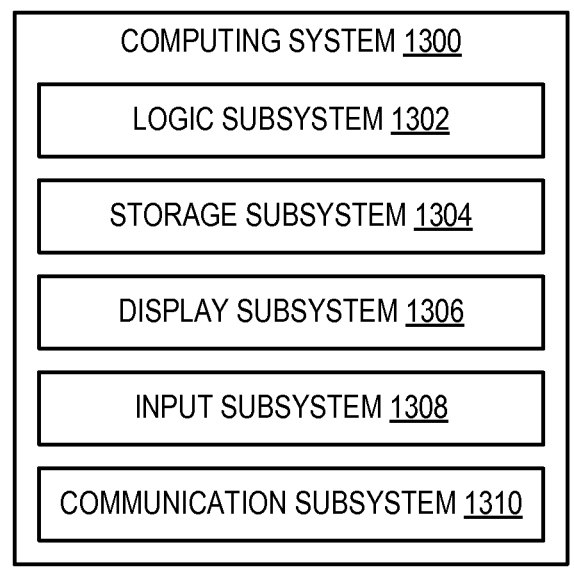
FIG. 13 shows an example computing system.

FIG. 13 schematically shows a non-limiting embodiment of a computing system 1300 that can enact one or more of the methods and processes described above. Computing system 1300 is shown in simplified form. Computing system 1300 may take the form of one or more personal computers, server computers, tablet computers, home-entertainment computers, network computing devices, gaming devices, mobile computing devices, mobile communication devices (e.g., smart phone), and/or other computing devices. For example, the computing system 1300 may be representative of a wearable computing system, such as the head-mounted computing system 100 shown in FIG. 1. As another example, the computing system 1300 may be representative of the environmental control system 202 and the plurality of wearable computing systems 204 (e.g., WEARABLE COMPUTING SYSTEM A, WEARABLE COMPUTING SYSTEM B, and WEARABLE COMPUTING SYSTEM N) shown in FIG. 2.

Computing system 1300 includes a logic subsystem 1302 and a storage subsystem 1304. Computing system 1300 also may include a display subsystem 1306, input subsystem 1308, communication subsystem 1310, and/or other components not shown in FIG. 13.

Logic subsystem 1302 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1302 may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 1304 includes one or more physical devices configured to hold instructions executable by the logic subsystem to implement the methods and processes described herein. When such methods and processes are implemented, the state of storage subsystem 1304 may be transformed—e.g., to hold different data.

Storage subsystem 1304 may include removable and/or built-in devices. Storage subsystem 1304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1304 may include volatile, nonvolatile, dynamic, static, read/write, read-only, random-access, sequential-access, location-addressable, file-addressable, and/or content-addressable devices.

It will be appreciated that storage subsystem 1304 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1302 and storage subsystem 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program: may be used to describe an aspect of computing system 1300 implemented to perform a particular function. In some cases, a module or program may be instantiated via logic subsystem 1302 executing instructions held by storage subsystem 1304. It will be understood that different modules may be instantiated from the same application, service, code block, object, library, routine, API, function, etc. Likewise, the same module or program may be instantiated by different applications, services, code blocks, objects, routines, APIs, functions, etc. The terms module and program may encompass individual or groups of executable files, data files, libraries, drivers, scripts, database records, etc.

When included, display subsystem 1306 may be used to present a visual representation of data held by storage subsystem 1304. This visual representation may take the form of a graphical user interface (GUI). As the herein described methods and processes change the data held by the storage subsystem, and thus transform the state of the storage subsystem, the state of display subsystem 1306 may likewise be transformed to visually represent changes in the underlying data. Display subsystem 1306 may include one or more display devices utilizing virtually any type of technology. Such display devices may be combined with logic subsystem 1302 and/or storage subsystem 1304 in a shared enclosure, or such display devices may be peripheral display devices.

When included, input subsystem 1308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple computing system 1300 with one or more other computing devices. Communication subsystem 1310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1300 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head-mounted computing system comprising:
  a see-through display configured to present an augmented reality image in front of a real-world environment when viewed through the see-through display;
  an optical sensor system configured to measure one or more environmental lighting parameters of the real-world environment;
  a logic subsystem; and
  a storage subsystem holding instructions executable by the logic subsystem to:
    present the augmented reality image via the see-through display;
    determine an image parameter of the image based on content in the augmented reality image;
    during presentation of the augmented reality image, receive one or more measured environmental lighting parameters from the optical sensor system, wherein the one or more measured environmental lighting parameters comprise one or more of an ambient light intensity and an ambient light color;
    determine that a display parameter of the see-through display has reached an end of an adjustment range; and
    in response to determining that the display parameter has reached the end of the adjustment range, during presentation of the augmented reality image, send a command to control an environmental control system external to the head-mounted computing system, wherein the command is configured to change one or more physical lighting parameters of the real-world environment to adjust the ambient light based on the image parameter of the image and the one or more measured environmental lighting parameters to visually enhance presentation of the augmented reality image.

2. The head-mounted computing system of claim 1, wherein the environmental control system comprises a remote-controlled lighting system.

3. The head-mounted computing system of claim 1, wherein the command is a first command, wherein the environmental control system further comprises a heating, ventilation, and air conditioning (HVAC) system, and wherein the instructions are further executable to send a second command configured to trigger an adjustment of an ambient temperature provided by the HVAC system.

4. The head-mounted computing system of claim 1, wherein the command is a first command, and wherein the storage subsystem holds instructions executable by the logic subsystem to:
during presentation of the augmented reality image, detect a content-based trigger; and
in response to the content-based trigger, send a second command to control the environmental control system, wherein the second command is configured to trigger adjustment of an environmental parameter to visually enhance presentation of content corresponding to the content-based trigger.

5. The head-mounted computing system of claim 1, wherein the command is a first command, and further comprising:
a sensor subsystem including one or more biometric sensors configured to provide biometric data of a human subject wearing the head-mounted computing system, wherein the storage subsystem holds instructions executable by the logic subsystem to determine a comfort characteristic of the human subject based on the biometric data, and during presentation of the augmented reality image, send a second command configured to trigger adjustment of an environmental parameter to change the comfort characteristic of the human subject.

6. The head-mounted computing system of claim 5, wherein the comfort characteristic comprises a stress level, and wherein the second command is configured to trigger adjustment of the environmental parameter to increase the stress level of the human subject.

7. The head-mounted computing system of claim 5, wherein the comfort characteristic comprises an estimated eye strain level, and wherein the second command is configured to trigger adjustment of the environmental parameter to decrease the estimated eye strain level of the human subject.

8. A wearable computing system, comprising:
a sensor subsystem including one or more biometric sensors configured to provide biometric data of a human subject wearing the wearable computing system in an environment;
a logic subsystem; and
a storage subsystem holding instructions executable by the logic subsystem to
receive eye imaging data from the one or more biometric sensors of the sensor subsystem;
using the eye imaging data, determine a comfort characteristic of the human subject; and
send a command to control an environmental control system external to the wearable computing system based on the comfort characteristic, wherein the command is configured to trigger adjustment of an environmental parameter to change the comfort characteristic of the human subject.

9. The wearable computing system of claim 8, wherein the environmental control system comprises one or more of a remote-controlled window shade and a remote-controlled lighting system, wherein the environmental parameter comprises an ambient light intensity of the environment, and wherein the command is configured to trigger adjustment of the ambient light intensity by adjusting the one or more of the remote-controlled window shade and the remote-controlled lighting system.

10. The wearable computing system of claim 8, wherein the storage subsystem holds instructions executable by the logic subsystem to
receive biometric data from the one or more biometric sensors of the sensor subsystem;
determine the comfort characteristic of the human subject based on the biometric data; and
send a second command to control the environmental control system, wherein the second command is configured to trigger adjustment of the environmental parameter to change the comfort characteristic of the human subject.

11. The wearable computing system of claim 10, wherein the one or more biometric sensors comprises one or more of a temperature sensor to provide a temperature of the human subject, a galvanic skin response (GSR) sensor to provide a skin conductance of the human subject, an optical sensor to provide an optical characteristic of an eye of the human subject, a heart rate sensor to provide a heart rate of the human subject, and a carbon dioxide ($CO_2$) sensor to provide a $CO_2$ level of breath exhaled by the human subject.

12. The wearable computing system of claim 10, wherein the comfort characteristic comprises an estimated eye strain level of the human subject.

13. The wearable computing system of claim 10, wherein the environmental control system comprises an HVAC system, wherein the environmental parameter comprises an ambient temperature of the environment, and wherein the instructions are further executable to send a command configured to trigger adjustment of the ambient temperature provided by the HVAC system to change the comfort characteristic of the human subject.

14. The wearable computing system of claim 13, wherein the comfort characteristic comprises a thermal level of the human subject.

15. On a computing system, a method for controlling ambient environmental conditions in an environment, the method comprising:
receiving biometric data from a plurality of wearable computing systems, each wearable computing system including one or more biometric sensors configured to provide the biometric data of a different human subject wearing the wearable computing system in the environment, and for each wearable computing system the biometric data representing a comfort characteristic of the human subject wearing the wearable computing system;
determining a collective comfort characteristic of a plurality of human subjects in the environment based on the biometric data received from the plurality of different wearable computing systems, wherein the collective comfort characteristic is based on an individual comfort characteristic of each human subject of the plurality of human subjects, and wherein the individual comfort characteristic of each human subject is based on biometric data of the human subject; and
controlling an environmental control system external to the plurality of wearable computing systems to adjust an environmental parameter of the environment to change the collective comfort characteristic of the plurality of human subjects.

16. The method of claim 15, wherein the environmental control system comprises one or more of a remote-controlled window shade and a remote-controlled lighting system, wherein the environmental parameter comprises an ambient light intensity of the environment, and wherein the one or more of the remote-controlled window shade and the remote-controlled lighting system are controlled to adjust the ambient light intensity of the environment to change the collective comfort characteristic of the plurality of human subjects.

17. The method of claim 16, wherein the collective comfort characteristic comprises an estimated eye strain level of the plurality of human subjects.

18. The method of claim 15, wherein the environmental control system comprises an HVAC system, wherein the environmental parameter comprises an ambient temperature of the environment, and wherein the HVAC system is controlled to adjust the ambient temperature of the environment to change the collective comfort characteristic of the plurality of human subjects.

19. The method of claim 18, wherein the collective comfort characteristic comprises an average thermal level of the plurality of human subjects.

* * * * *